Nov. 27, 1945.   B. C. PLACE   2,389,635
FASTENER
Filed July 15, 1943

Inventor
Bion C. Place
By Strauch & Hoffman
Attorneys

Patented Nov. 27, 1945

2,389,635

UNITED STATES PATENT OFFICE 2,389,635

FASTENER

Bion C. Place, Detroit, Mich., assignor of one-half to George E. Gagnier, Detroit, Mich.

Application July 15, 1943, Serial No. 494,878

3 Claims. (Cl. 85—5)

The present invention relates to an improvement in spring stud fasteners of the type in which the stud part has a high degree of expansibility and contractibility that is utilized to draw the structure supported by the fastener yieldingly toward the supported structure. More particularly, the invention is concerned with such a fastener constructed from wire in a form to retain all of its inherent advantages and in addition provide it with a further desirable attribute adapting it to special uses.

My Patent No. 1,679,266, granted July 31, 1928, discloses the preferred form of spring stud fastener of which the present invention constitutes an improvement. The fastener of said patent has been very extensively used in the successful securement of automobile and like trim materials, such as door and body panels, moldings, floor mats and similar structures, for example. The fastener is extremely effective in action and was frequently employed because it permitted ready removal of the secured structure by withdrawal of the stud parts of fasteners from the supporting structure apertures, and the expeditious replacement of the former structure. In installations in which a permanent connection between the supported and supporting structures is essential, the fastener of my patent has not been regarded as entirely satisfactory because of the possibility of inadvertent disengagement of the stud part of the fastener from the supporting structure.

The present invention has for its principal object the improvement of the fastener of my said patent to make it normally irremovable from the supporting structure, once it has been applied without destroying or altering any of the desirable characteristics of the fastener that it inherently possesses in holding the supported structure firmly and yieldingly in place and without loss of its inherent ease of application of the fastener to its intended uses.

A further object of the invention is to provide a spring stud fastener with means, yieldable when the stud part is entered in its socket, arranged to spring into position after entry of said part to positively prevent disconnection of the fastener from said socket.

A further object of the invention is to provide a one-piece wire spring stud fastener with portions in the form of the wire ends preventing inadvertent withdrawal of the stud part from its socket or the like.

Figure 1:
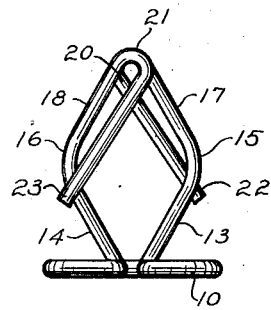
Figure 2:
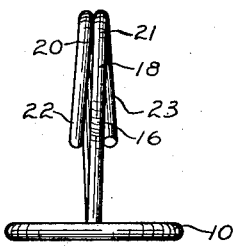
Figure 3:
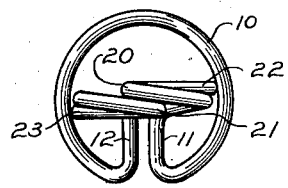
Figure 4:
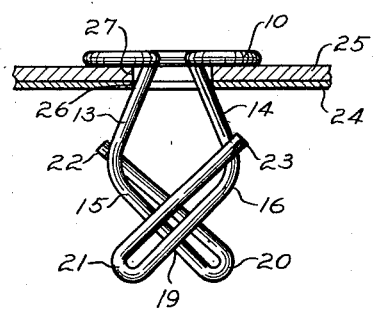

Further important subordinate objects of the invention will appear as a description proceeds with reference to the accompanying drawing in which, Figure 1 is a side elevation of the improved fastener of the present invention, showing it in normal uncompressed condition, Figure 2 is an end view thereof, Figure 3 is a view looking toward the underside of the head, Figure 4 is a fragmentary sectional view illustrating a preferred mode of use of the improved fastener, the latter being shown in compressed condition in a supporting structure.

Like reference characters indicate like parts throughout the several figures.

The improved fastener of the present invention comprises a head part consisting of a loop 10 and arms 11 and 12 bent inwardly of one side of the loop, said arms being disposed in the plane of the loop. The head part is formed from the midportion of a single piece of wire. Any conventional circular or flat wire may be used. Preferably the piece of wire is first bent to form the fastener and after formation of the fastener the wire is tempered to provide the desired springiness in its parts.

The stud part of the fastener consists of two outwardly bowed legs 13 and 14, said legs being carried by the arms 11 and 12 respectively of the head. Said legs diverge from the head to points 15 and 16 of maximum outward bowing located preferably approximately midway of the length of the stud part. Beyond said points the legs have convergent portions 17 and 18. As shown in Figure 2, the legs also are each inclined with respect to a normal to the plane of the head so that they can pass each other in scissors-like fashion at the entering end of the stud part and so that they may cross each other at 19.

Each of the legs carries a return-bent wire portion, formed from an end of the piece of wire from which the fastener is made, said return-bent portions being designated 20 and 21 in the drawing. Preferably said portions approximately parallel the convergent portions 17 and 18 of the legs and each of said portions is formed to extend substantially beyond the outer edges of the legs between the points 15 and 16 of maximum outward bowing of said legs and the head 10. Thus a pair of projections 22 and 23 are provided protruding laterally beyond the legs. Said projections comprise the extreme ends of the piece of wire.

A preferred manner of use of the improved fastener is illustrated in Figure 4 in which 24 designates the supporting structure and 25 the supported structure. The former may be any metal or like frame member. The latter may be any covering material, panel or the like. Structures 24 and 25 are provided with approximately aligned apertures 26 and 27 respectively, through which the stud part of the fastener may be passed in attaching the supported structure to the supporting structure.

In passing the stud part through the aperture in the supporting structure, which forms the fastener socket, it will be understood that the legs 13 and 14 are first caused to move toward each other in contracting the stud part such action putting the arms 11 and 12 under torsion. After the legs have been so moved to permit the passage of the widest part of the stud part through aperture 26, which has a diameter materially smaller than the overall width of the stud part measured across the points of maximum outward bowing, said legs are permitted to move toward their original position thus expanding the stud part in the socket as the fastener moves toward final or holding position. As the stud part further enters the socket the projections 22 and 23 yield permitting the stud part to pass through the aperture in the supporting structure. In the final position of said part the projections 22 and 23 are preferably materially spaced from the inside of structure 24, no reliance being placed on said projections to retain the supported and supporting structures in firm contact under a yielding pressure exerted by the fastener. As is apparent from Figure 4, the fastener may be displaced a considerable distance before abutments 22 and 23 contact the walls of opening 26 and prevent withdrawal from the supporting structure.

The latter effect is produced by engagement of the inclined holding shoulders on the divergent portions of the legs of the stud part with the inner peripheral corner of aperture 26 forming the socket, and by the fact that in applied position the legs preferably assume a position inwardly of that which they would occupy if the aperture were large enough to permit them to move to a point to relieve the arms 11 and 12 of torsion. Preferably said aperture is smaller than this and as a consequence the fastener legs exert a continuously effective resilient pressure on the fastener head that is effective to draw the supported structure toward the supporting structure and then hold said structures resiliently in contact. The walls of opening 26 therefore hold the fastener in a state of "compression," with the two arms crossed as shown in Figure 4, against the torsional action of arms 11 and 12, which constantly tend to return the fastener to the free or uncompressed condition illustrated in Figures 1, 2 and 3.

It will be observed thus that the desirable fastener action is not modified by the presence of the projections 22 and 23 but that said projections positively prevent withdrawal of the stud part once said part is in applied position, by providing unyielding abutments when a force is exerted tending to pull the fastener out of its socket in the supporting structure. The fastener is thus useful in situations where a fixed connection is desired of the fastener regardless of unusual stresses or strains that may otherwise effect a disconnection of the fastener from its socket.

It will be understood that the head of the fastener may assume any known form, this invention residing in the stud or entering part. For example, the fastener head may assume that of any of my Patents Nos. 1,896,590, granted February 7, 1933; 2,057,587, granted October 13, 1936; 2,058,622, granted October 27, 1936; 2,087,358, granted July 20, 1937; 2,117,571, granted May 17, 1938; 2,136,981, granted November 15, 1938; 2,254,311, granted September 2, 1941; or 2,275,553, granted March 10, 1942.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:

1. A one-piece wire headed spring stud fastener having an entering portion consisting in two outwardly bowed legs arranged to pass each other in scissors fashion at the end of said portion remote from the head, each of said legs having a wire end return-bent from said end of said entering portion toward said head and terminating laterally beyond said entering portion.

2. A one-piece wire headed spring stud fastener having an entering portion consisting in two outwardly bowed legs arranged to pass each other in scissors fashion at the end of said portion remote from the head, each of said legs having a wire end return-bent from said end of said entering portion toward said head and terminating laterally beyond said entering portion and between the point of maximum outward bowing of said legs and said head.

3. An expansible and contractible spring stud fastener having a head and long inclined holding shoulders and a pair of projections extending beyond said shoulders at points spaced substantially from said head, said projections consisting in wire end portions arranged in crossed relation beyond said shoulders whereby said portions will yield when the stud part is entered in a socket or the like.

BION C. PLACE.